(12) United States Patent
Segal et al.

(10) Patent No.: US 11,725,711 B2
(45) Date of Patent: Aug. 15, 2023

(54) CABLE SYSTEM AND FASTENER FOR SAME

(71) Applicant: MANOMETAL SOLUTIONS LTD, Ramat Yishai (IL)

(72) Inventors: Tuvia Segal, Haifa (IL); Eli Aharon, Ramat Yishai (IL); Amit Hertzl, Ramat Yishai (IL)

(73) Assignee: MANOMETAL SOLUTIONS LTD, Ramat Yishai (IL)

( * ) Notice: Subject to any disclaimer, the term of this patent is extended or adjusted under 35 U.S.C. 154(b) by 209 days.

(21) Appl. No.: 17/264,825

(22) PCT Filed: Jul. 20, 2019

(86) PCT No.: PCT/IB2019/056221
§ 371 (c)(1),
(2) Date: Jan. 31, 2021

(87) PCT Pub. No.: WO2020/026064
PCT Pub. Date: Feb. 6, 2020

(65) Prior Publication Data
US 2021/0293304 A1    Sep. 23, 2021

Related U.S. Application Data

(60) Provisional application No. 62/713,000, filed on Aug. 1, 2018.

(51) Int. Cl.
*F16G 11/04* (2006.01)
*F16G 11/10* (2006.01)

(52) U.S. Cl.
CPC .......... *F16G 11/048* (2013.01); *F16G 11/106* (2013.01)

(58) Field of Classification Search
CPC .......................... F16G 11/048; F16G 11/106
See application file for complete search history.

(56) References Cited

U.S. PATENT DOCUMENTS

| | | | |
|---|---|---|---|
| 434,691 A | 8/1890 | Wilcox | |
| 593,256 A | 11/1897 | Velie | |
| 1,137,796 A | 5/1915 | Seifert | |
| 1,727,687 A | 9/1929 | Agobian | |
| 8,997,315 B2 | 4/2015 | LeBeau | |
| 10,099,087 B2 * | 10/2018 | Truesdell | A62B 35/0075 |
| 2017/0182928 A1 | 6/2017 | Seader | |

FOREIGN PATENT DOCUMENTS

GB          721464          1/1955

* cited by examiner

*Primary Examiner* — David M Upchurch
(74) *Attorney, Agent, or Firm* — The Law Office of Joseph L. Felber

(57) ABSTRACT

A fastener is provided for receiving a cable. The fastener includes at least one through-going passageway for receiving the cable and at least one pawl like member that projects into the passage and is used for engaging the cable.

20 Claims, 14 Drawing Sheets

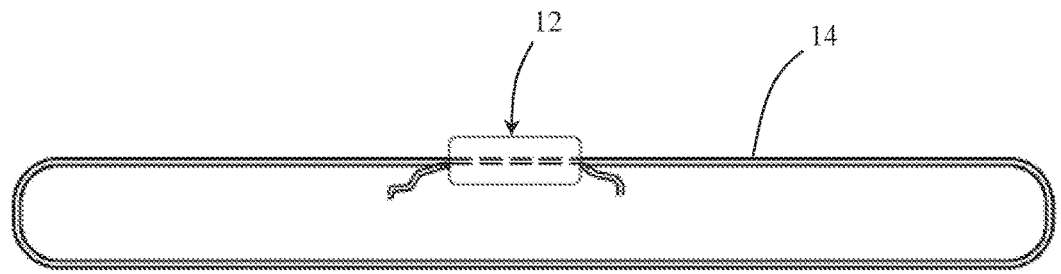
Fig. 2A
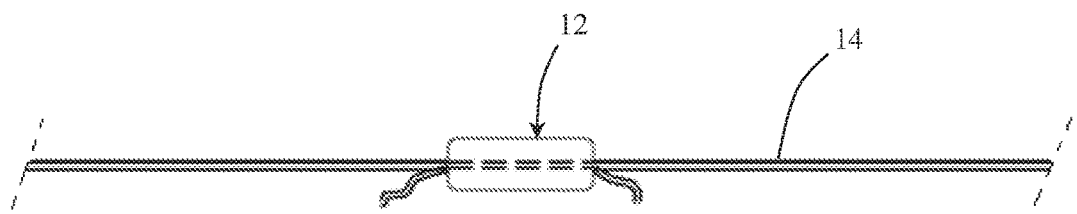
Fig. 2B
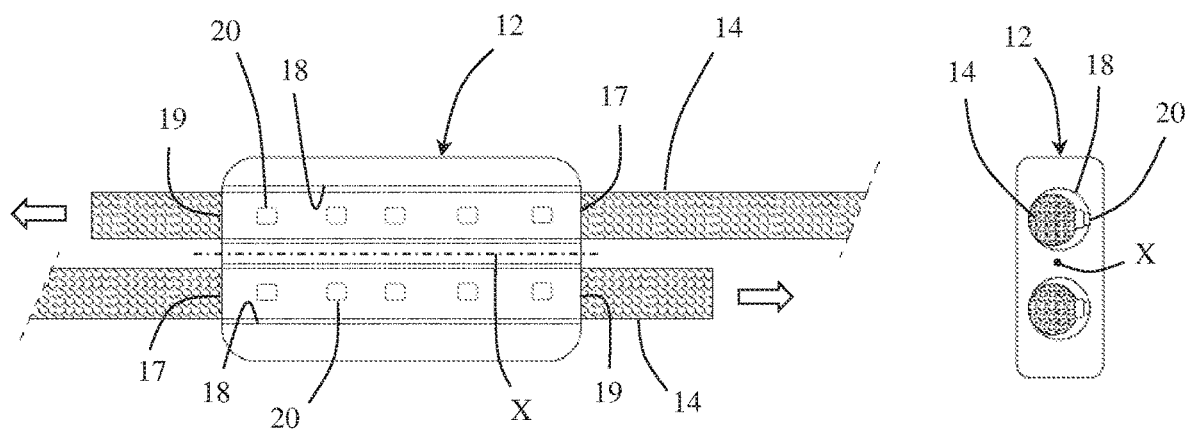
Fig. 3A
Fig. 3B

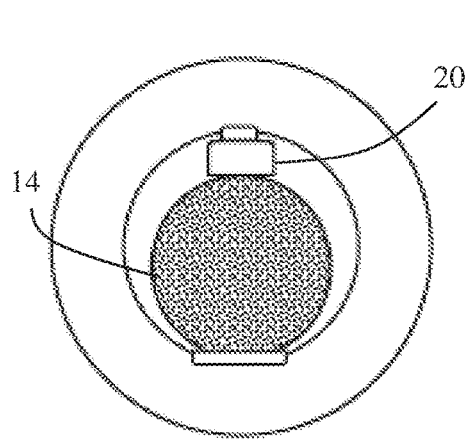
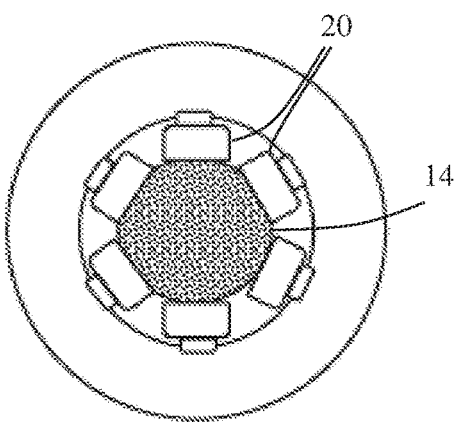
Fig. 9A    Fig. 9B
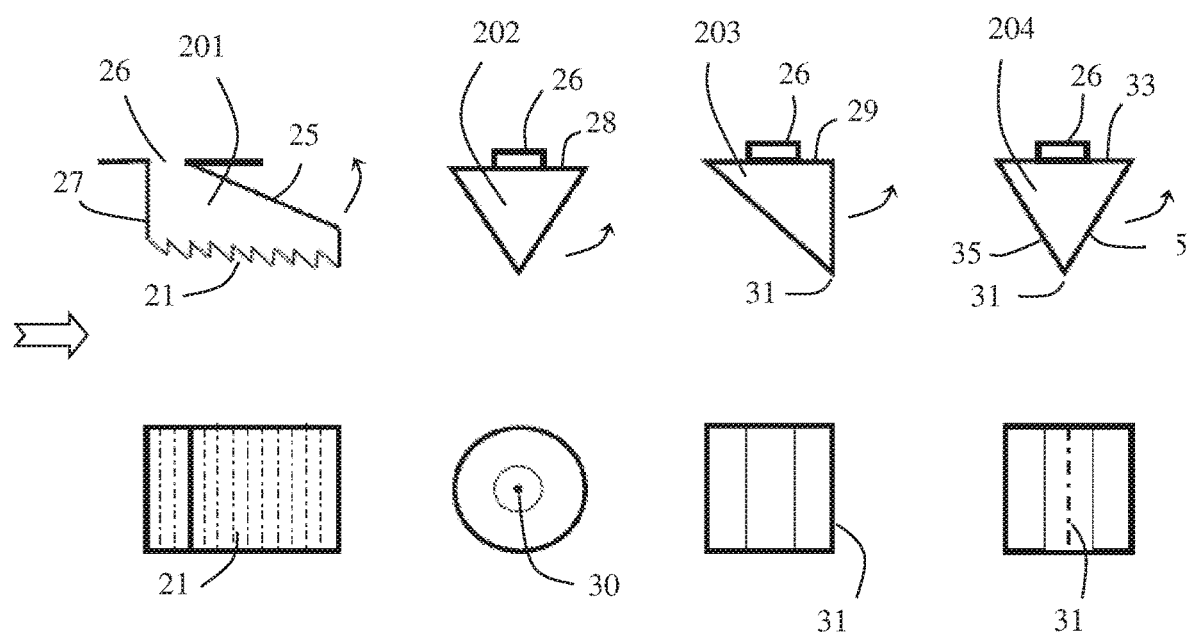
Fig. 9C

CABLE SYSTEM AND FASTENER FOR SAME

TECHNICAL FIELD

Embodiments of the invention relate to a cable system and a fastener for a cable system, and in particular to a fastener for securing cables(s) in the system.

BACKGROUND

In various scenarios, it may be required to fasten between cable segments, such as between two ends of a cable or between two or more separates cables. Such fastening may be useful in various applications, such as in fences (e.g. when erecting a fence), when holding together electrical cables or wires, when attaching between two or more ropes e.g. in a recreational boat, or even in mundane uses around the house, such as in a clothesline.

When fastening between cable segments it may be required to fasten the cables to each other so that they are not released easily or unintentionally, and/or the fastening may be used to apply tension in one or more of the cables that are fastened.

SUMMARY

The following embodiments and aspects thereof are described and illustrated in conjunction with systems, tools and methods which are meant to be exemplary and illustrative, not limiting in scope.

In an embodiment there is provided a fastener for receiving a cable, the fastener comprising at least one through-going passage for receiving a cable and at least one pawl projecting into the passage for engaging the cable.

Possibly, the pawl is configured to engage the cable in a ratchet-like engagement substantially preventing the cable from being pulled back out of the passage.

Possibly, the passage extends between incoming and outgoing openings and opens out of the fastener via these openings, and the ratchet-like engagement is configured to occur to a greater extent when the cable enters the passage via the incoming opening than via the outgoing opening.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which:

FIGS. 2A and 2B schematically show examples of cable segments, either of the same cable or two different cables, respectively, being fastened to a fastener according to at least certain embodiments of the present invention;

FIGS. 3A and 3B schematically show, respectively, a partial transparent top view and a front view of an embodiment of a fastener of the present invention;

FIGS. 9A and 9B schematically show front views of fastener embodiments, respectively exhibiting, one or more pawls of the fasteners interacting with a cable;

FIG. 9C schematically shows side and bottom views of possible pawls that may be used in at least certain fastener embodiments of the present invention;

Figure 1:
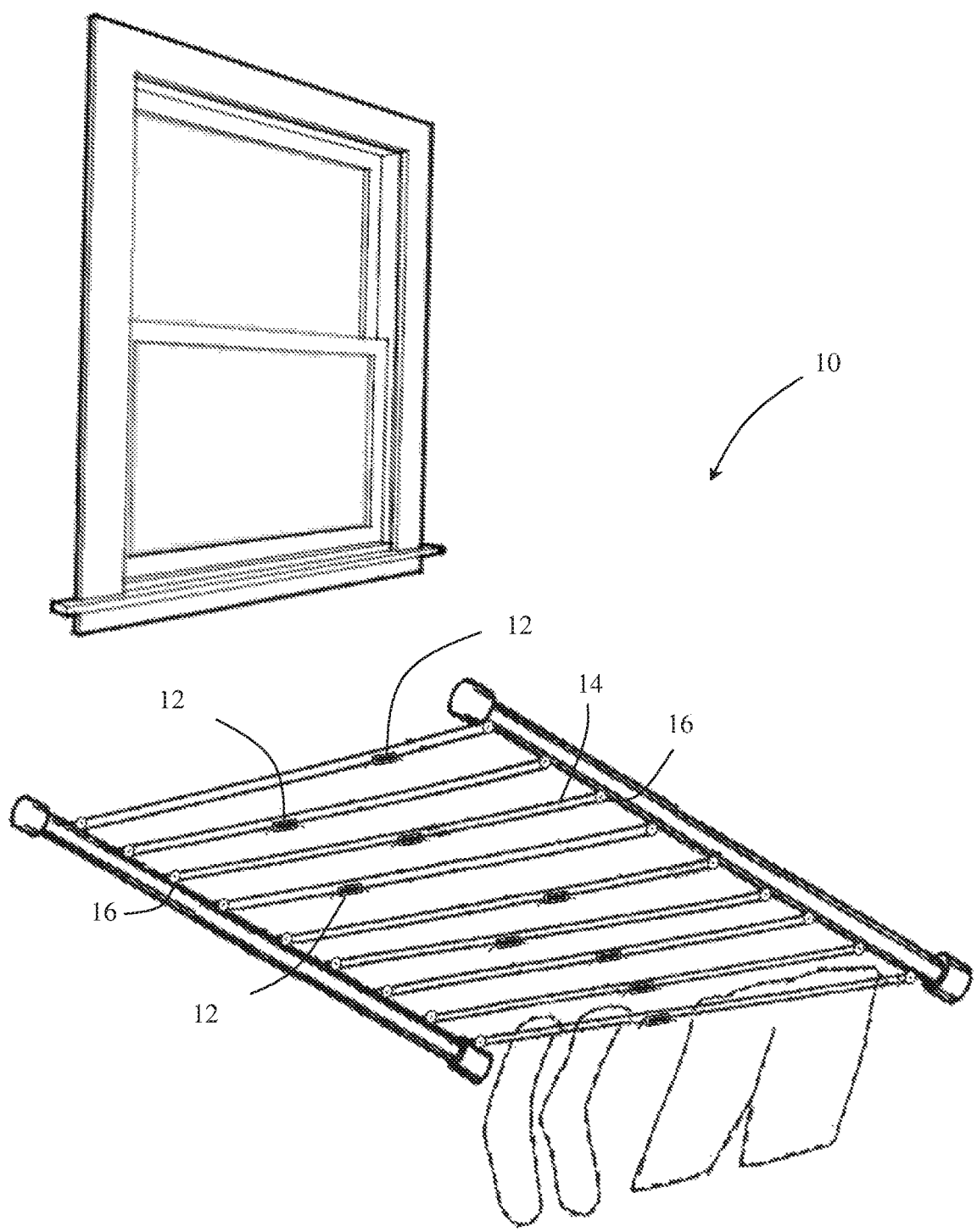
FIG. 1 schematically shows a clothesline cable system including fasteners according to at least certain embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Attention is first drawn to FIG. 1 schematically illustrating one possible cable system 10 where fasteners 12 according to at least certain embodiments of the invention may be used. In this example, the cable system is a clothesline, here an example of a clothesline attached to a wall of a dwelling adjacent a window of the dwelling.

It is to be understood that the clothesline here shown as an example of a cable system, is only one possible example of where fasteners according to at least certain embodiments of the invention may find use. That is to say that the discussed fastener embodiments herein may find use in other applications, such as in fastening cables in fences, fastening together electrical cables or wires, fastening ropes e.g. in a recreational boat, and the like.

In addition it is noted that the kind of clothesline here illustrated, being attached to a wall of a dwelling, is only one example of a clothesline that may make use of at least certain fastener embodiments of the present invention, and hence any clothesline type may be considered as equally suitable for benefiting from use of at least certain fastener embodiments of the invention.

Fasteners according to at least certain embodiments of the invention may be formed from plastic materials, such as polyamide or nylon (e.g. nylon 66); and in some embodiments may also be disposable. That is to say that after being fitted to fasten onto a cable, may be released from their grip onto the cable by cutting the fastener or otherwise harming it so that it may then be thrown away preferably for recycling.

In examples where a cable, intended to be fastened to a fastener embodiment of the invention, includes an at least partial soft outer face; the fastener may fasten onto the cable by pinning at least portions thereof into the cable's outer face or layer. For example, a cable suitable for a clothesline may be formed from wire strands (e.g. steel strands) that have an outer coating (e.g. of PVC), and at least certain fastener embodiments may be configured to pin at least portions thereof into this outer coating.

With attention still drawn to FIG. 1, cable system 10 is seen including a plurality of cables 14 extending each between a pair of pulleys 16 located at opposing lateral sides of the system 10. Each cable after looping around a respective pulley extends back towards a position where both ends of the cable meet to be fastened by a fastener according to the various embodiments of the invention.

Hence in this example of FIG. 1, the cables 14 loop around so that cable segments at respective ends of each cable meet and are fastened at a fastener. In other examples, the cable system may include cable segments, each extending from a respective lateral side of the system to meet and be fastened at a fastener.

Attention is drawn to FIG. 2A illustrating a cable 14 forming a loop with end segments of the cable meeting and being fastened by an embodiment of a fastener 12 of the present invention. FIG. 2B, illustrates an example where two cable segments, possibly of two separate cables meet to be fastened by an embodiment of a fastener 12 of the present invention.

FIGS. 3A and 3B illustrate a fastener embodiment 12, possibly similar to that shown in FIG. 2A or 2B, here seen including a pair of axially extending passageways 18 extending through the fastener and pawl like members 20 located on an inner side of each passageway and projecting into the passageway.

In the embodiments herein disclosed, the various types of pawl like member(s) disclosed may be referred to as pawl(s). Such pawl(s) (or pawl like member(s)) are understood to be elements that act to interact and engage with cables in order to maintain such cables substantially fastened within the various fastener embodiments disclosed herein.

Attention is still drawn to FIGS. 3A and 3B. Each passageway 18 in fastener 12 has incoming and outgoing openings 17, 19 located at opposing axial sides of the fastener, and the pawls 20 are configured to form engagement between the fastener and each cable, substantially preventing the cable from being pulled back out of a respective passageway, after being inserted into the respective passageway 18 through its incoming opening. Possibly, the engagement between at least some of the pawls 20 and each cable may be of a ratchet-like type substantially preventing the cable from being pulled back out of a respective passageway.

In the fastener embodiment shown in FIGS. 3A and 3B, the passageways 18 are configured to have their incoming openings 17 at opposing axial sides of the fastener, and hence both ends of the cable 14 as illustrated by the marked arrows in FIG. 3A are configured to be inserted into the fastener from opposing axial sides in order to be fastened to fastener 12.

Figure 4A:
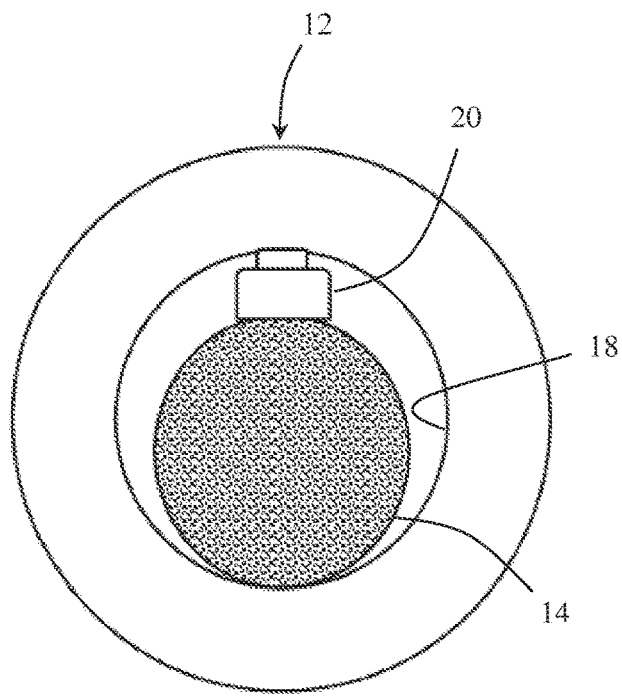
FIGS. 4A and 4B schematically show, respectively, front and cross sectional views of an embodiment of a fastener of the present invention.
Figure 4B:
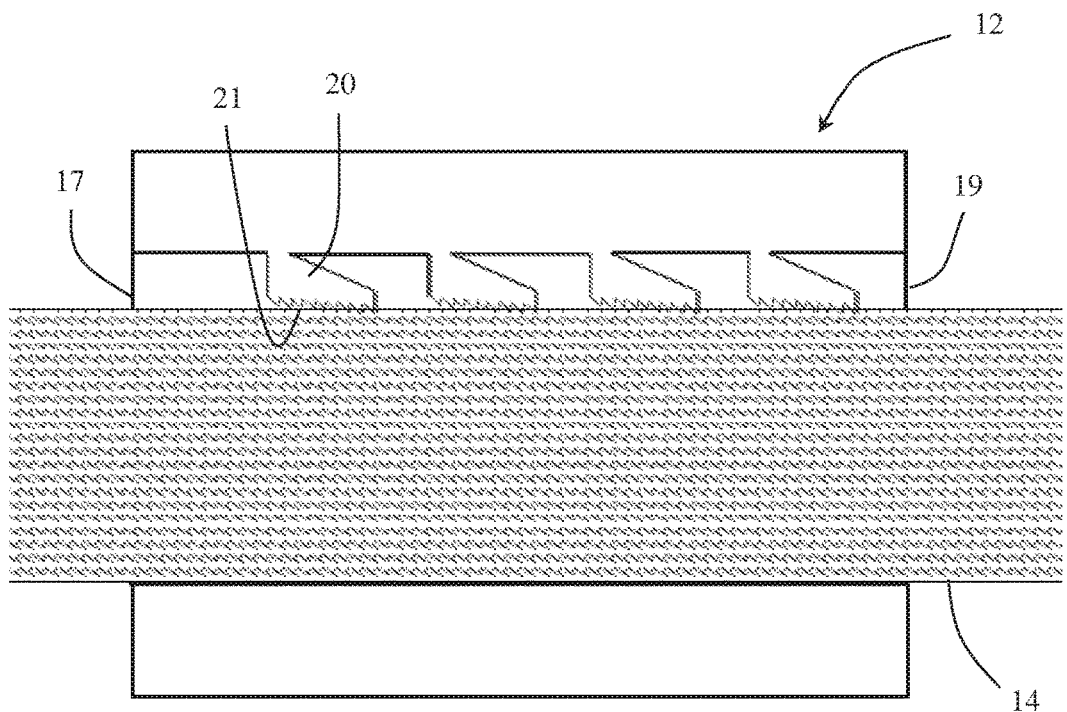

Attention is drawn to FIGS. 4A and 4B illustrating an embodiment of a fastener 12 including a single passageway 18 for receiving a cable 14 in order to fasten the cable. Fastener 12 in this example also includes pawls 20 located within a passageway for engaging an incoming cable inserted into the passageway. Each pawl 20 here optionally includes ragged teeth 21 at its bottom side which are configured to engage cable 14 in order to increase hold onto the cable.

The passageway has incoming and outgoing openings 17, 19; and the pawls 20 are configured to form engagement between the fastener and the cable, substantially preventing the cable from being pulled back out of the passageway, after being inserted into the passageway 18 through its incoming opening. Possibly, the engagement may be of a ratchet-like type.

Figure 5A:
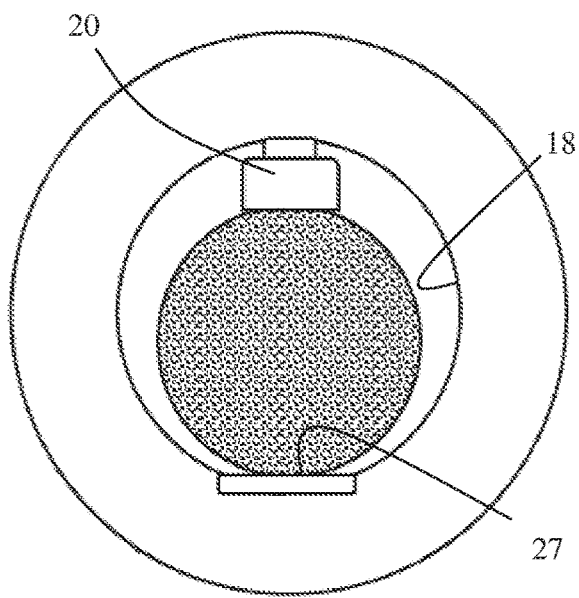
FIGS. 5A and 5B schematically show, respectively, front and cross sectional views of another embodiment of a fastener of the present invention.
Figure 5B:
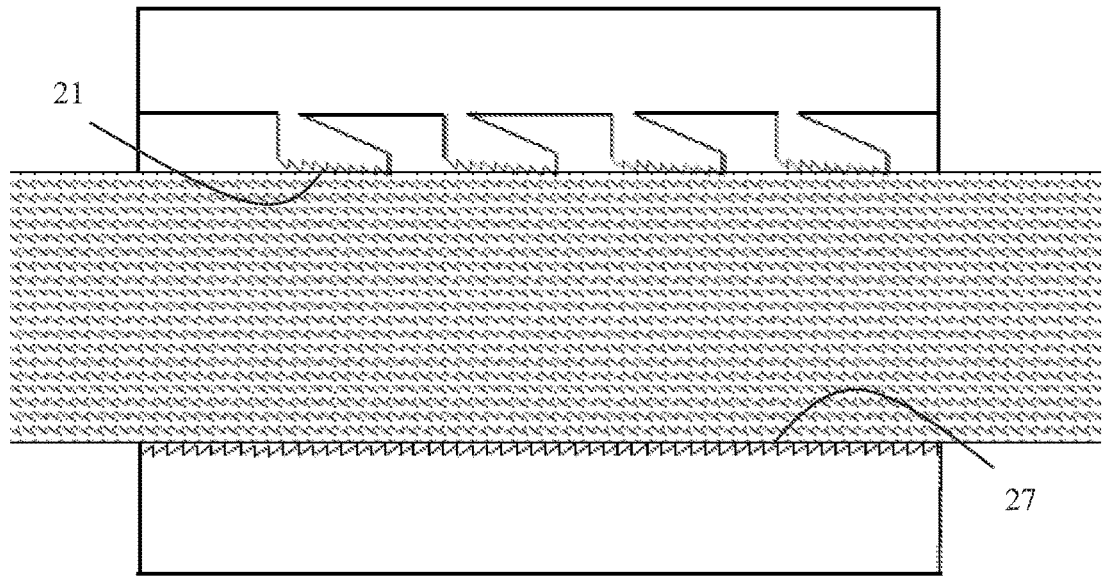

Attention is drawn to FIGS. 5A and 5B illustrating an embodiment generally similar to that shown in FIG. 4, however in this example also including a bearing surface 27, here possibly including ragged teeth, at a bottom side of passageway 18 at an orientation about the passageway's periphery generally opposite the one or more pawls 20 included in such a fastener. In the shown example, pawl 20 is seen also including optional ragged teeth 21 at its bottom side.

Figure 6A:
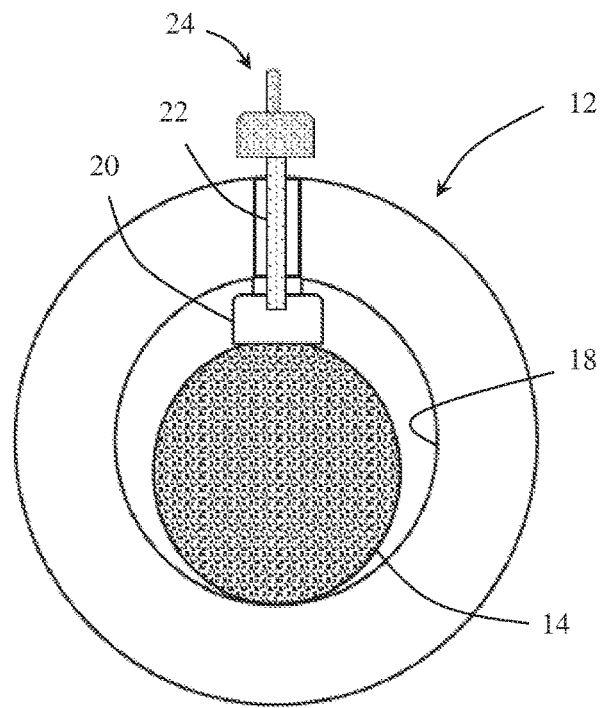
FIGS. 6A and 6B schematically show, respectively, front and cross sectional views of yet another embodiment of a fastener of the present invention.
Figure 6B:
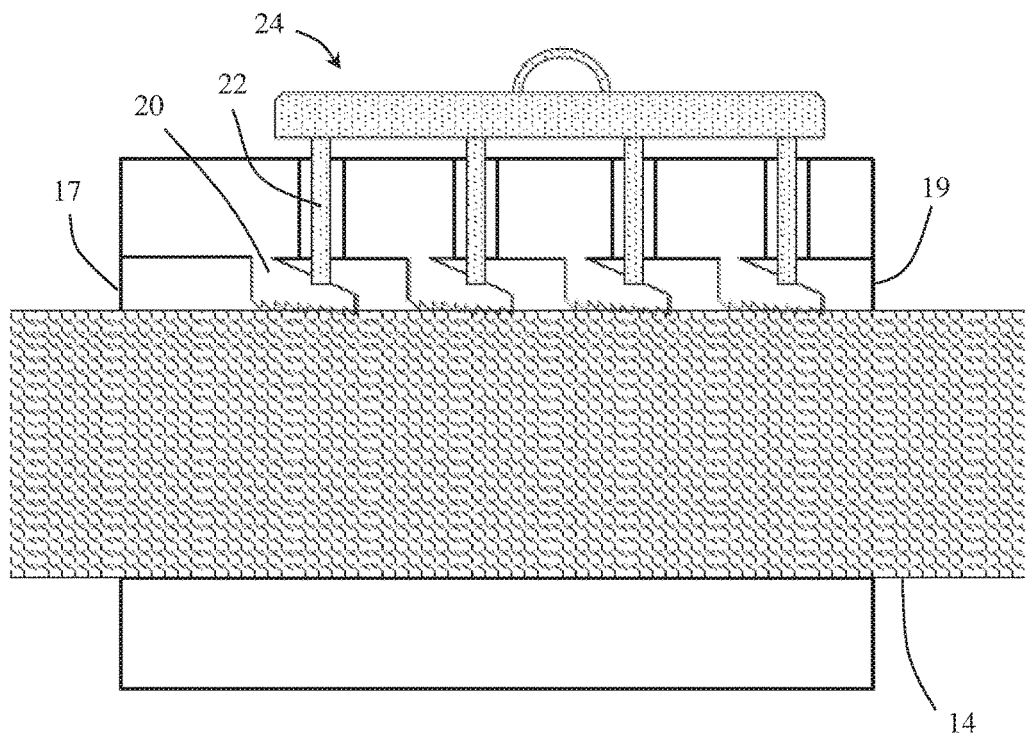

Attention is drawn to FIGS. 6A and 6B illustrating an embodiment of a fastener 12 including a single passageway 18 for receiving a cable 14 in order to fasten the cable. In this example, fastener 12 includes a tab 22 associated with each pawl 20 that upon lifting is configured to lift its respective pawl in order to release the engagement between the pawl and the cable, so that the cable can be loosened and/or removed out of the fastener.

Fastener 12 in this embodiment may include a collective 24 coupled to all the tabs 22, for possibly lifting all tabs and consequently all the pawls together away from the cable so that the cable can be loosened and/or removed out of the fastener.

Figure 7A:
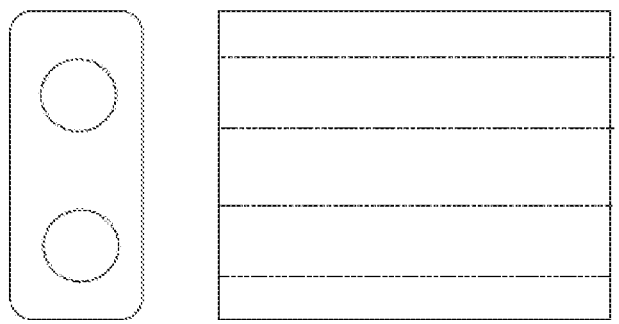
FIGS. 7A to 7C schematically show additional embodiments of fasteners.
Figure 7B:
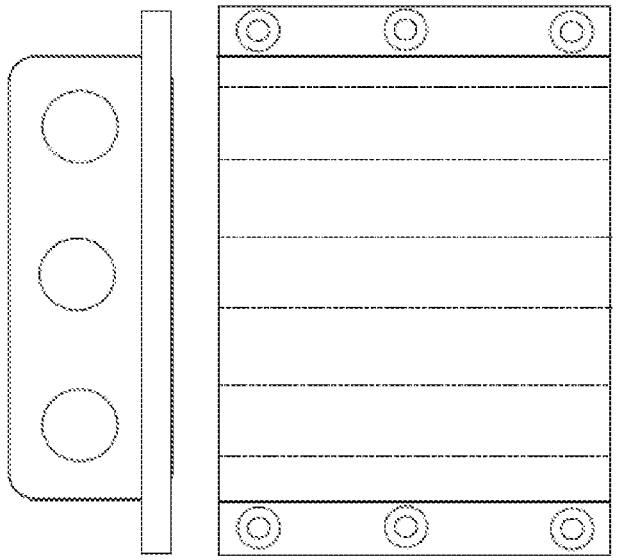
Figure 7C:
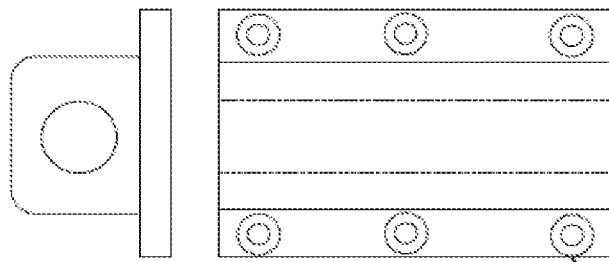

Attention is drawn to FIGS. 7A to 7C illustrating additional various embodiment of fasteners of the invention for attaching to cables. In FIG. 7A, an embodiment generally similar to that shown in FIGS. 3A and 3B is illustrated. In FIG. 7B, a fastener embodiment configured to attach to three cables is illustrated. In FIG. 7C, a fastener embodiment, generally similar to that shown in FIGS. 4 to 6 is illustrated, which is configured for attachment to a single cable.

Also seen in these examples is that at least certain fastener embodiments may be provided with fixing means 33, here in the form of bores, for mounting the fasteners to a possible adjacent object (not shown), so that such fastener becomes substantially fixed in location and the cables being attached thereto.

Figure 8A:
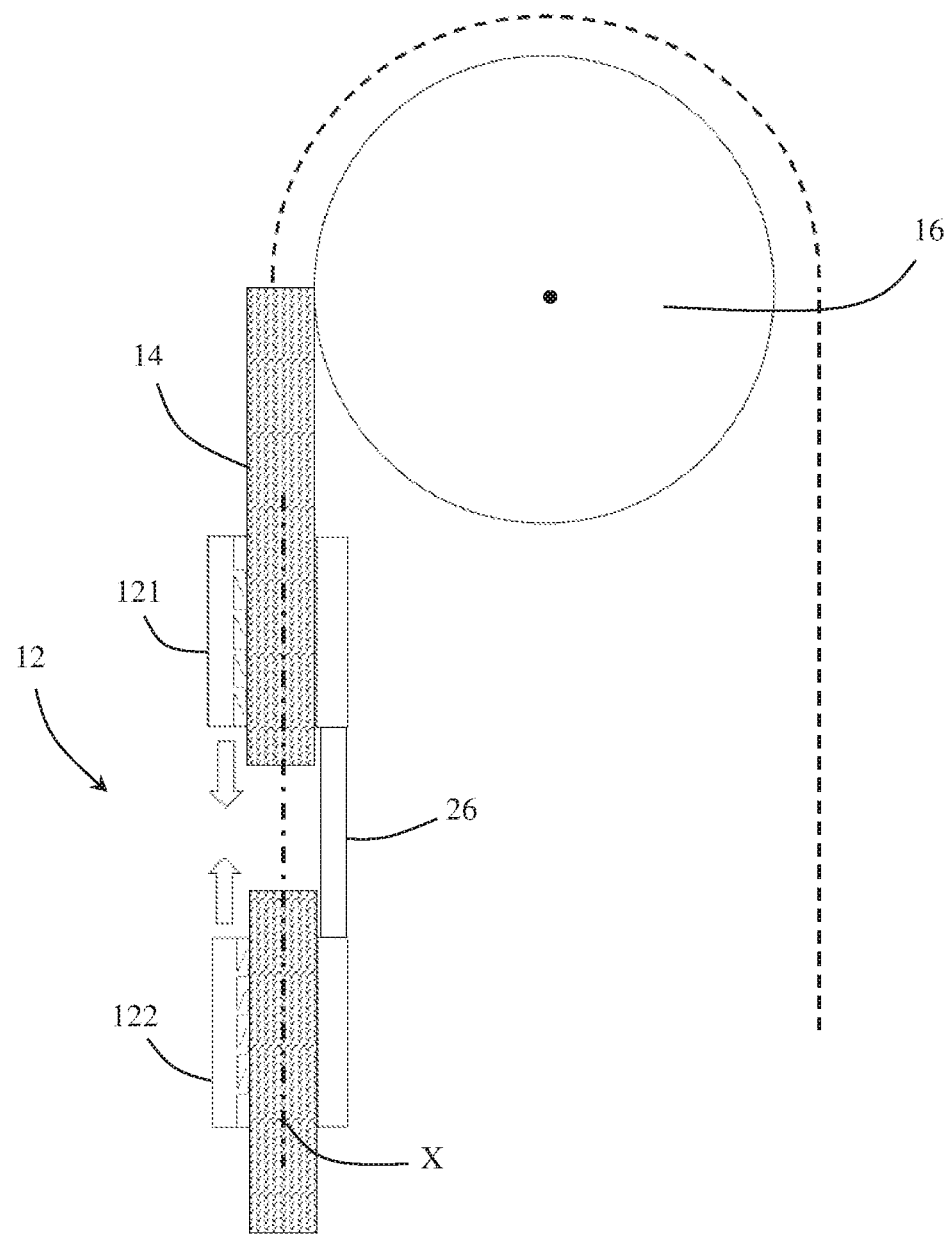
FIGS. 8A and 8B schematically show other embodiments of a fastener of the present invention.

Attention is drawn to FIG. 8A illustrating an embodiment of a fastener 12 including a resilient member 26 imparting resiliency to at least a portion of the fastener. Resilient member 26 may be generally more flexible than other portions of the fastener, possibly due to material from which it is made (i.e. more flexible and/or elastic than material of other segments of the fastener); and/or due to its geometry e.g. including a reduced cross sectional area (as in the shown example) in relation to other portions of the fastener, such as fastening members 121, 122 of the fastener.

In the shown example, the resilient member 26 is located along the axis X of the fastener, in this example in-between the fastening members 121, 122 of the fastener. Resiliency of fastener 12 in this example may be provided by increased flexibility of the segments 121, 122 to flex one in relation to the other as indicated by the arrows. Such flexibility may be advantageous for example when such fastener connects to a cable 14 configured to loop around a pulley 16, so as to facilitate the transition of the fastener when maneuvered around the curve of the pulley.

Figure 8B:
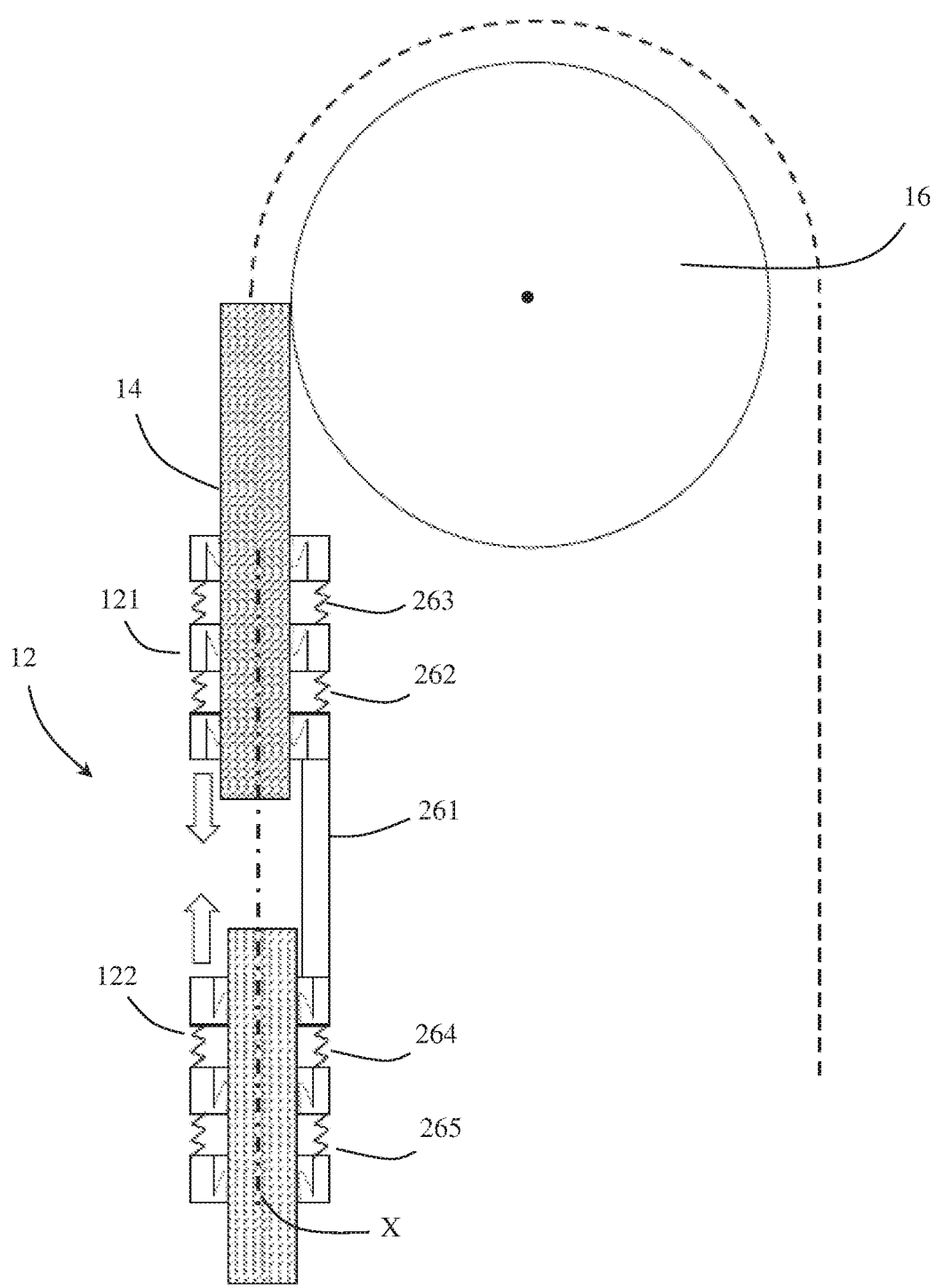

Attention is drawn to FIG. 8B illustrating an embodiment of a fastener 12 including a plurality of resilient members 261 to 265 imparting resiliency to at least portions of the fastener. Resilient members 261 to 265 may be generally more flexible than other portions of the fastener, possibly due to material from which they are made (i.e. more flexible and/or elastic than material of other segments of the fastener); and/or due to their geometry e.g. including a reduced cross sectional area (as in the shown example e.g. in member 261) in relation to other portions of the fastener, such as fastening members 121, 122 of the fastener.

In the shown example, the resilient members 261 to 265 are located along the axis X of the fastener, in this example in-between the fastening members 121, 122 of the fastener and also embedded within each fastening member 121, 122. Resiliency of fastener 12 in this example may be provided by increased flexibility of the segments 121, 122 to flex towards or away from each other and/or such increased flexibility being embedded within each segment 121, 122. Such flexibility may be advantageous for example when such fastener connects to a cable 14 configured to loop around a pulley 16, so as to facilitate the transition of the fastener when maneuvered around the curve of the pulley.

Attention is drawn to FIGS. 9A to 9C illustrating various configurations of pawls that may be used in at least certain fastener embodiments of the present invention. In FIG. 9A, a front view of a fastener (such as any one of the fastener embodiments herein) is illustrated including in the shown cross section one single pawl 20 located about the periphery of the fastener's passageway 18. In this example, a possible bearing surface 27 may be located opposite the pawl so that a cable 14 passing within the passageway may be fastened between the pawl and the bearing surface.

In FIG. 9B, a front view of a fastener (such as any one of the fastener embodiments herein) is illustrated including in the shown cross section several pawls 20 (here 6) being located about the periphery of the fastener's passageway 18. In this example, a cable 14 passing within the passageway may be fastened between the pawls that are configured to engage the cable about its periphery.

In FIG. 9C at the top row, various side views of pawl structures/embodiments are illustrated with the row beneath illustrating respective bottom views of the pawls from a side configured to interact and engage with the cable. The arrow to the left of FIG. 9C illustrates the direction of entry of a cable into a fastener including each one of these pawls. Each pawl in these examples is shown attached to the remainder of the fastener (this remainder not illustrated here) via a base 26.

The first pawl to the left 201 from a side view (see top row) has a general right angle triangular profile with its base 26 being located generally where its hypotenuse 25 and shorter leg meet 27. Upon entry of a cable into a fastener including such pawl 201, the pawl is configured to slightly flex and pivot about the base 26 as indicated by the arrow added to this pawl, while once located within the fastener any attempt to pull the cable out of the fastener will urge the pawl to slightly flex back and pivot about the base 26 in the counter direction and hence increase its grip on the cable via its possible lower ragged teeth 21.

Pawl 202 is generally cone shaped including base 26 at its flat bottom 28 from which the cone tapers to a generally pointed tip 30. Upon entry of a cable into a fastener including such pawl 202, the pawl is configured to slightly flex and pivot about the base 26 as indicated by the arrow added to this pawl, while once located within the fastener any attempt to pull the cable out of the fastener will urge the pawl to slightly flex and pivot about the base 26 in the counter direction and hence increase its grip on the cable.

Pawl 203 form a side view (see top row) has a general right angle triangular profile with its base 26 being located generally at a center of one of its legs 29. Upon entry of a cable into a fastener including such pawl 203, the pawl is configured to slightly flex and pivot about the base 26 as indicated by the arrow added to this pawl, while once located within the fastener any attempt to pull the cable out of the fastener will urge the pawl to slightly flex and pivot about the base 26 in the counter direction and hence increase its grip on the cable via a pointed ridge 31 of the pawl generally located between the pawl's hypotenuse and other leg.

Pawl 204 form a side view (see top row) has a general isosceles triangular profile with its base 26 being located generally at a center of its bottom 33 from which the two generally equal sides 35 project. Upon entry of a cable into a fastener including such pawl 204, the pawl is configured to slightly flex and pivot about the base 26 as indicated by the arrow added to this pawl, while once located within the fastener any attempt to pull the cable out of the fastener will urge the pawl to slightly flex and pivot about the base 26 in the counter direction and hence increase its grip on the cable via a pointed ridge 31 of the pawl generally located between the pawl's equal sides.

Figure 10A:
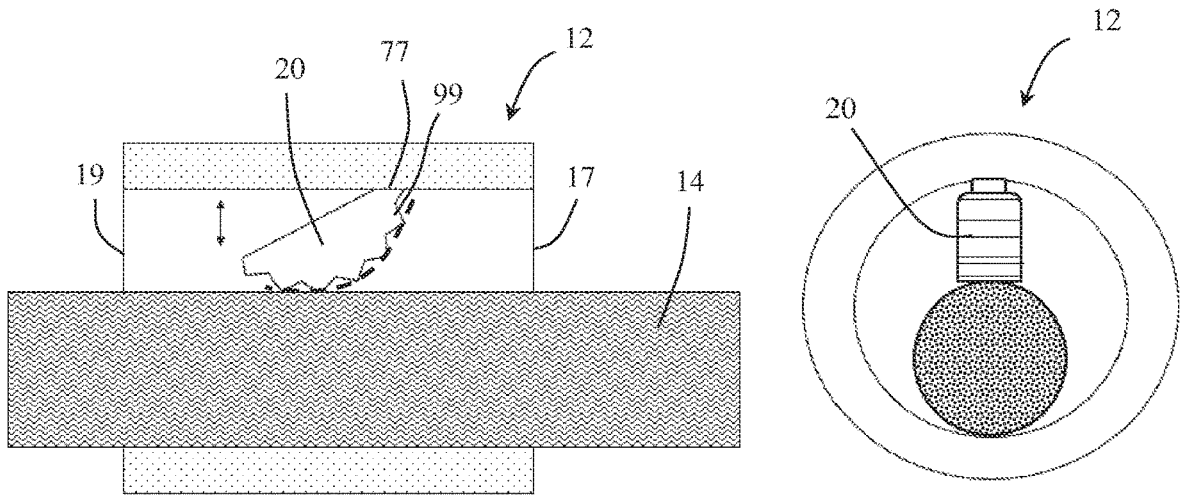
FIGS. 10A and 10B schematically show each a cross-sectional side view at left and front view at right of further fastener embodiments.
Figure 10B:
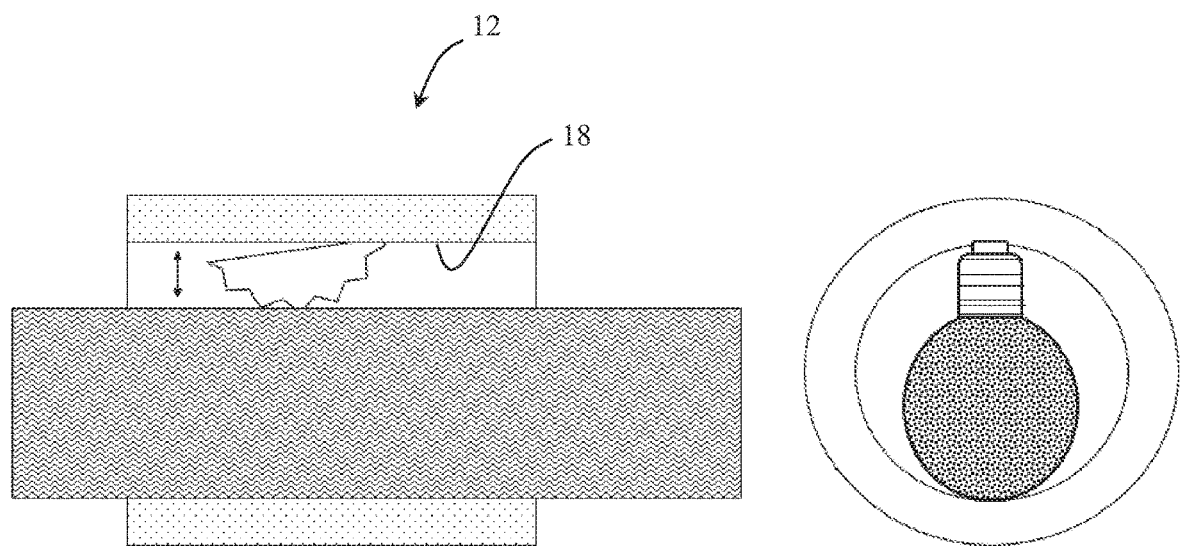

Attention is drawn to FIGS. 10A and 10B illustrating a fastener embodiment 12 from a cross-sectional side view (at left) and a front view (at right). Fastener 12 in this embodiment includes a self-adjusting pawl 20 that is arranged for fastening onto various cable diameters.

Pawl 20 is hinged at its upper side at a joint 77 to an inner side of a passageway 18 of this fastener through which a cable 14 may be inserted in order to be fastened by the fastener. Passageway 18 has incoming and outgoing openings 17, 19 located at opposing axial sides of the fastener and the cable may be inserted through the incoming opening in order to be fastened. A lower side of pawl 20 includes projecting teeth 99 who's tips lie on a general curved route indicated by the 'dashed line' marked in the left-hand side of FIG. 10A.

Insertion of a cable with a diameter suitable to enter passageway 18 via the passageway's incoming opening 17, will result in the cable being engaged with at least some of the teeth 99 of pawl 20 and in the pawl being urged to rotate about joint 77. The larger the diameter of the cable as seen in FIG. 10B, the larger the rotation that pawl will exhibit about joint 77 to accommodate the incoming cable.

Figure 11A:
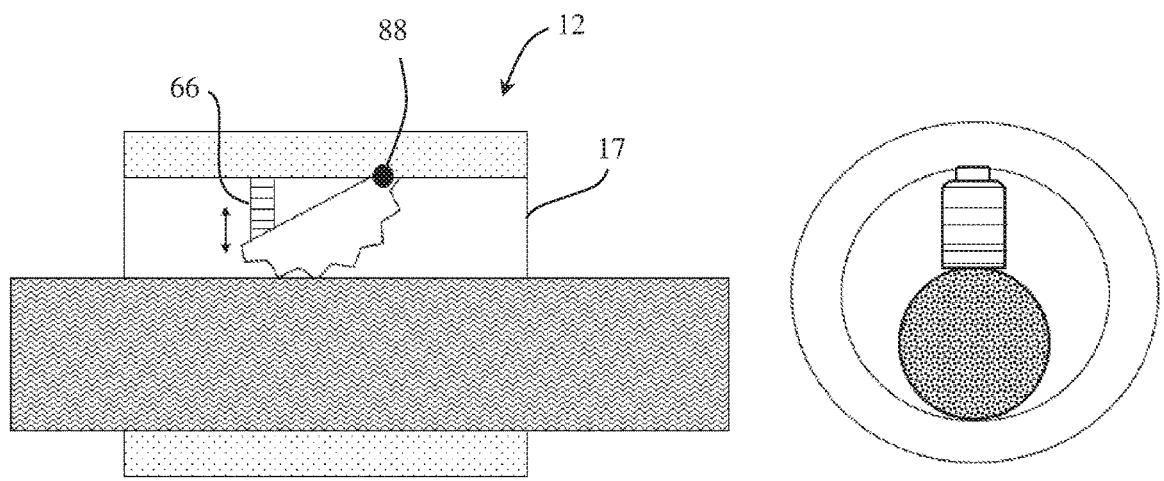
FIGS. 11A and 11B schematically show each a cross-sectional side view at left and front view at right of yet further fastener embodiments.
Figure 11B:
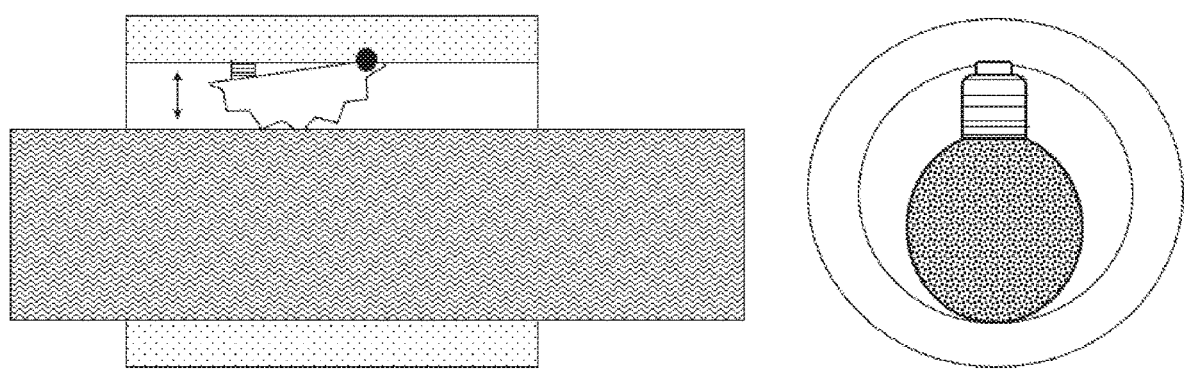

Attention is drawn to FIGS. 11A and 11B illustrating a fastener embodiment 12 generally similar to that illustrated in FIG. 10, however here with the pawl being connected to the inner face of the passageway 18 via a pin/shaft joint 88. Pawl 20 in FIG. 11 also includes a spring 66 here in the form of a compression spring arranged to urge pawl 20 into passageway 18 and towards incoming cables.

Insertion of cables of varying diameter into passageway 18 of this fastener via its incoming opening 17 will result in such cables being urged to flex the pawl about its pin/shaft joint 88 in a first rotational direction to an extent suitable for accommodating the cable. Once inserted into the fastener, the cable will be fixed in the fastener via the teeth on the pawl, and upon attempt to remove the cable the teeth of the pawl will flex back in the counter direction about pin/shaft joint 88 to dig and hold onto the cable.

Figure 12A:
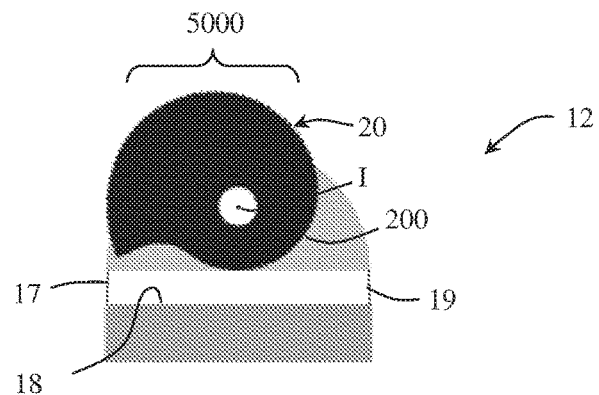
FIGS. 12A to 12C schematically show cross-sectional side views of a fastener embodiment during various stages of use.
Figure 12B:
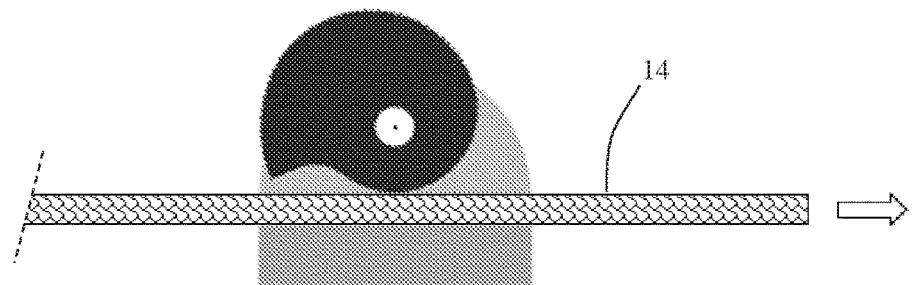
Figure 12C:
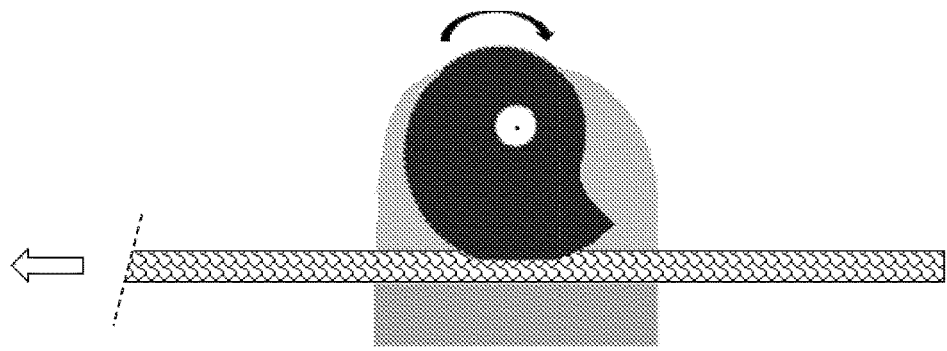

Attention is drawn to FIGS. 12A to 12C schematically illustrating a possible embodiment of a fastener 12 of the present invention. Fastener 12 in this embodiment includes an axially extending passageway 18, incoming and outgoing openings 17, 19 located at opposing axial sides of the fastener and a pawl 20 in communication and exposure to passageway 18.

Pawl 20 in this example may be hinged for rotation about an axis I and may have an outer spiral contact face 200 that curves in a plane orthogonal to axis I and winds about axis I at a continuously increasing radial distance from axis I. Contact face 200 may be arranged to include a friction enhancing surface for example with ragged teeth.

In FIG. 12A pawl 20 is seen positioned about axis I, with a portion of its contact face 200 that has a relative small distance from axis I, being adjacent and exposed to passageway 18. This position of the pawl may be suitable for insertion of a cable 14 through incoming opening 17 into passageway 18 as illustrated by the arrow indicated in FIG. 12B.

Once placed within passageway 18, the cable may be fastened within fastener 12 by rotating pawl 20, in this example in a clock-wise direction (see arrow marked in FIG. 12C) about axis I, resulting in exposure towards the passageway and cable of portions of the contact face 200 with increasing distances from axis I. As a result, such portions of the contact face with increasing radial distances form axis I may be urged to project into the passageway and bear and fasten against the cable.

It is noted that rotation of the pawl about axis I in some cases may also be manually urged, since segments of the pawl's contact face may be arranged to be exposed also to the exterior of the fastener (see area marked 5000 in FIG. 12A where a portion of pawl 20 may be arranged to be exposed to the exterior of the fastener for such possible manual manipulation). Such manual rotation may be useful in urging initial contact between the pawl and the cable, while further pivoting of the pawl about axis I may be urged due to contact between the cable and pawl that may urge the pawl to rotate due to movements of the cable attempting to withdraw the cable back out of the fastener (in the direction of the 'hollow arrow' marked in FIG. 12C).

Such actions attempting to withdrawn the cable out of the fastener may act to secure the cable within the fastener, while tension or other forces (indicated by the 'hollow arrow' in FIG. 12C) acting to try and remove the cable from within the fastener's passageway back out via the incoming opening, may simply increase the grip of pawl 20 against the cable by urging portions of the contact face having larger distances from axis I to bear against the cable and "dig" into the cable while pressing it against inner faces of passageway 18.

Figure 13A:
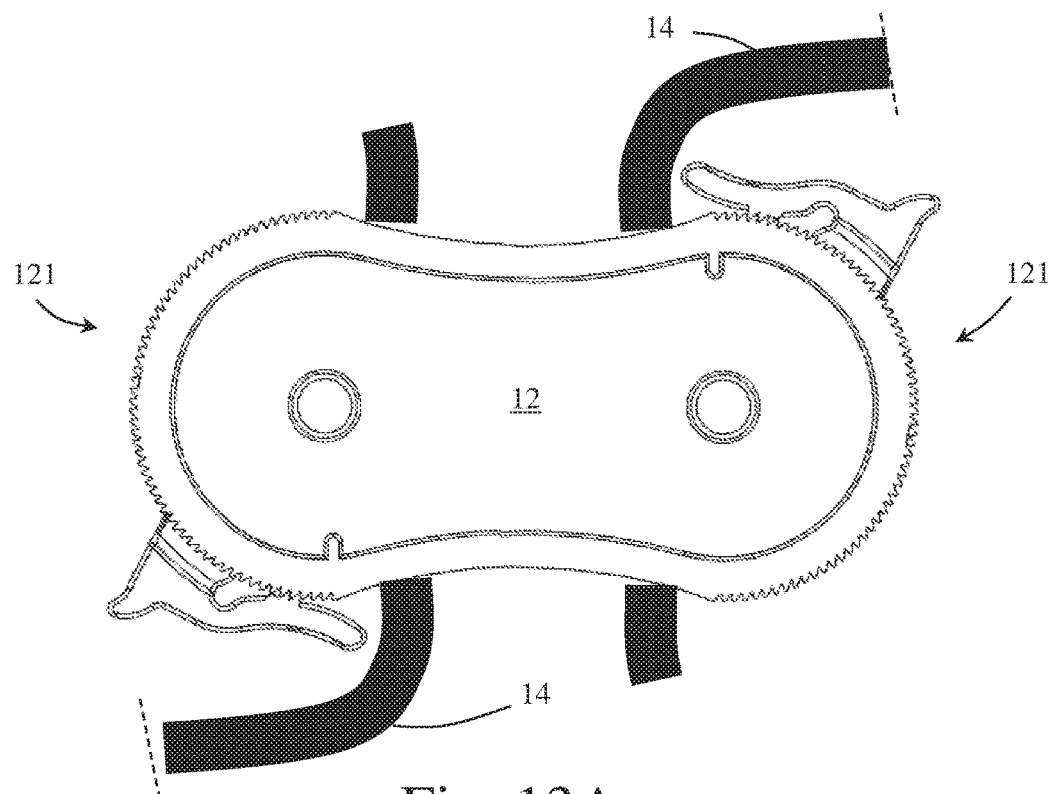
FIGS. 13A and 13B schematically show respective side and cross sectional side views of a fastener embodiment in an unfastened state.
Figure 13B:
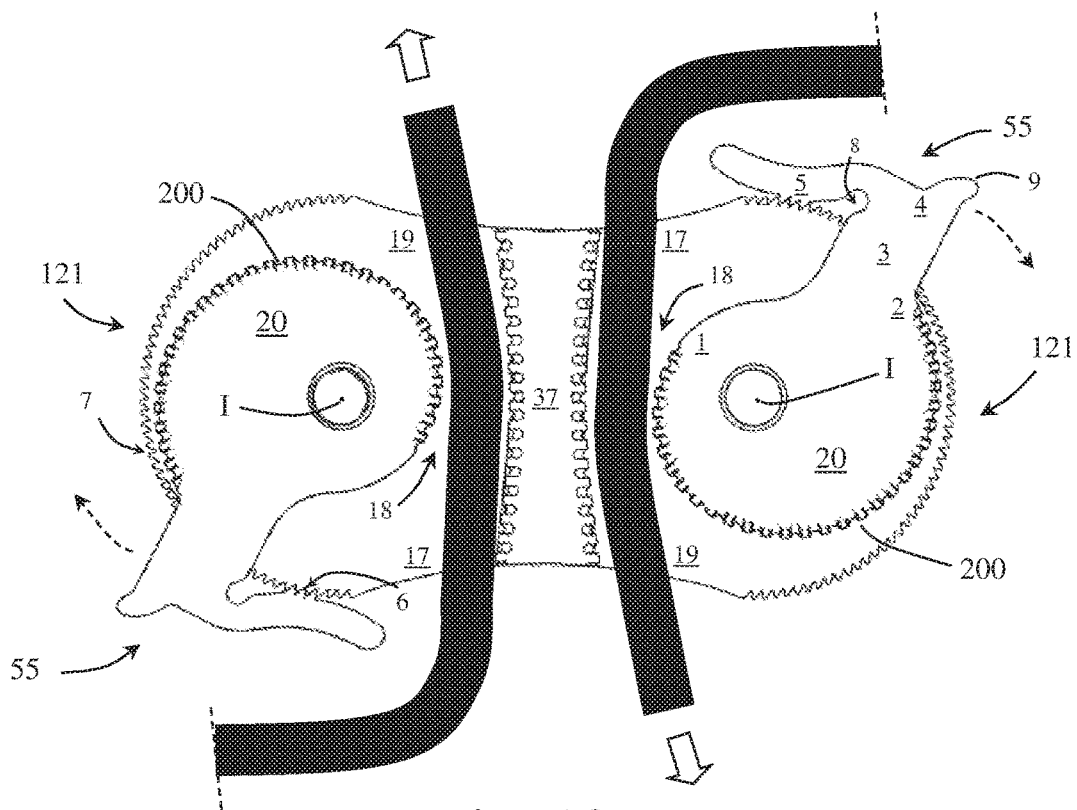

Attention is drawn to FIGS. 13A and 13B schematically illustrating a further possible embodiment of a fastener 12 with the lower figure (13B) being a cross sectional view of the upper figure (13A). Fastener 12 in this embodiment includes two fastening segments 121, here generally identical segments rotated one with respect to the other.

Each fastening segment 121 is arranged to attach to a cable 14 or an end of a cable, possibly ends the same cable that loops around e.g. pulleys and extends back towards a position where both ends of the cable meet to be fastened by the fastener. Each fastening segments 121 includes in addition a passageway 18, incoming and outgoing openings 17, 19 located at opposing upper and lower sides of the fastener and a pawl like member 20 in communication and exposure to passageway 18.

Pawl like member 20 in this example may be hinged for rotation about an axis I and may have an outer spiral contact face 200 that curves in a plane orthogonal to axis I and winds about axis I from a beginning 1 at a continuously increasing radial distance from axis I to an end 2 (as in the embodiment of e.g. FIG. 12). Contact face 200 may be arranged to include a friction enhancing surface for example with ragged teeth.

In FIG. 13B pawl like member 20 is seen positioned about axis I, with a portion of its contact face 200 generally adjacent beginning 1 that has a relative small distance from axis I, being adjacent and exposed to passageway 18. This position of the pawl like member 20, where it substantially doesn't intrude and/or project much into passageway 18, may be suitable for insertion of a cable 14 via incoming opening 17 through passageway 18 and possibly out via outgoing aperture 19—as illustrated by the double lined arrows indicated in FIG. 13B.

Once placed within passageway 18, the cable may be fastened within a respective fastening member by rotating pawl like member 20, in this example in a clock-wise direction about axis I (see dashed arrows marked in FIG. 13B), resulting in exposure towards the passageway and cable of portions of the contact face 200 that are closer to end 2 and thus intrude and/or project a larger extent from axis I into the passageway. As a result, such portions of the contact face with increased radial distance form axis I may be urged to bear and fasten the cable against an opposing wall 37 that bounds an opposite side of the passageway (wall 37 is also possibly placed between the two segments 121 of the fastener).

Figure 14A:
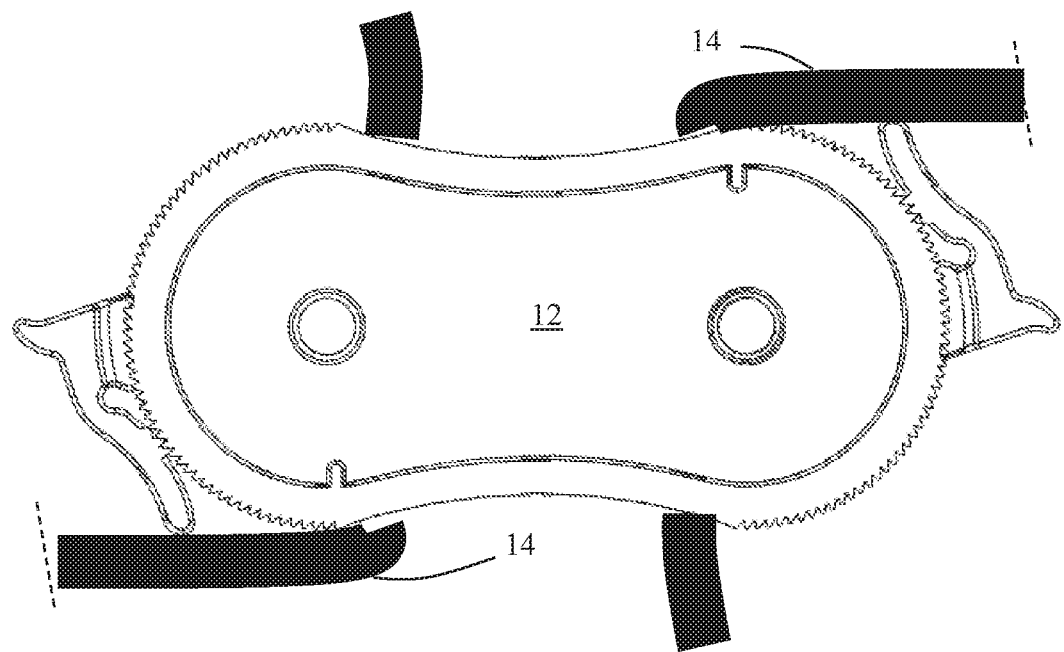
FIGS. 14A and 14B schematically show respective side and cross sectional side views of a fastener embodiment in a fastened state.
Figure 14B:
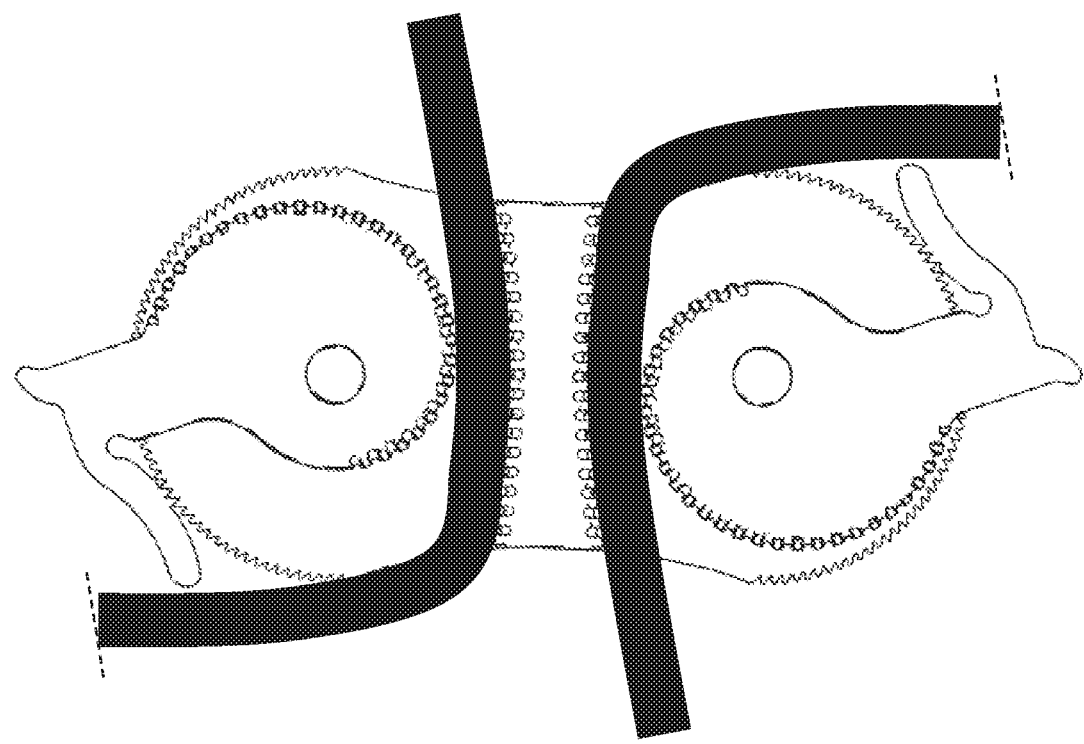

FIG. 14A and its cross section in FIG. 14B illustrate the fastener 12 embodiment of FIG. 13—with both its segments 121 being in a fastened state where they bear against and fasten a cable 14 (or two end portions, possibly of the same cable) against wall 37. Notably, the embodiment of fastener 12 seen in FIGS. 13 and 14 includes a toggle 55 that as here exemplified may be formed integral with each pawl like member 20.

Toggle 55 includes a stem 3 that projects away from its pawl like member 20 (in a general outer radial direction away from axis I) to a top 4 that is exposed to the exterior of the fastener. Toggle 55 in addition includes an arm 5 that is exposed to the exterior of the fastener and extends away from top 4 in a counter clock-wise direction about axis I.

Arm 5 includes a teeth arrangement 6 at its radial inner side that faces towards the fastener, which is arranged to engage and mesh with a respective teeth arrangement 7 formed on an outer facing side of the fastener. Arm 5 may be resiliently attached to stem 3 in order to urge its teeth arrangement 6 (in an un-flexed state) to bear against and mesh with teeth arrangement 7. Possibly said resiliency is imparted via a recess 8 that is formed adjacent where arm 5 and stem 3 merge.

A lever 9 formed at the outer side of top 4 is arranged to manually urge arm 5 (possibly via a user's thumb bearing against lever 9) to flex away and release its meshing engagement with teeth 7. While maintaining toggle in this released position, a user may be able to urge pawl like member 20 (via stem 3) to rotate about axis I and by that either increase or decrease the fastening forces that pawl like member 20 exerts against the cable. Toggle 55 may thus permit easy manipulation via a user's finger (e.g. thumb) of fastener 12 in this embodiment between fastened (FIG. 14) and unfastened (FIG. 13) states.

In the embodiment of the fastener seen in FIGS. 13 and 14—the teeth arrangements 6 and 7 may be angled in such a manner that allows motion of toggle 55 (and thus pawl 20) about axis I in only one direction while maintaining the teeth arrangements 6 and 7 in a meshed state. In the illustrated example, such "meshed" motion while teeth 6 and 7 mesh is designed to occur in a clock-wise direction about axis I that increases the fastening effect of pawl 20 against a cable.

To release the fastener from such fastened state against the cable, toggle 55 may accordingly be manipulated to flex in order to un-mesh teeth 6 and 7 from each other and by that permit manual manipulation of toggle 55 and consequently pawl 20 in a counter clock-side direction about axis I.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Further more, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

The invention claimed is:

1. A fastener comprising at least one through-going passageway and at least one pawl member, the pawl member projecting into the passageway and being hinged for rotation about an axis and comprising a spiral shaped contact face formed about the axis that is arranged to be exposed to the passageway, the fastener further comprising a toggle fixed to the pawl member for assisting in rotating the pawl member about the axis, the toggle comprising a stem for connecting to the pawl member and an arm that is resiliently attached to the stem and comprises a teeth arrangement that is arranged in an un-flexed state of the arm to enter into meshing engagement with a corresponding teeth arrangement formed on the fastener in order to permit rotation of the pawl member in only one direction about the axis, wherein the arm of the toggle being arranged to resiliently flex in order to be released from the meshing engagement in order to permit rotation of the pawl member in both clock-wise and counter clock-side directions about the axis.

2. The fastener of claim 1 and being for receiving an elongated strip of material within the through-going passageway.

3. The fastener of claim 2 and being arranged to connect to an end portion of the elongated strip of material.

4. A method for fastening comprising the steps of:
providing a fastener that comprises at least one through-going passageway and at least one pawl member projecting into the passageway,
wherein the fastener further comprising:
a toggle comprising a stem and an arm that is resiliently attached to the stem, wherein the toggle being fixed to the pawl member via the stem for assisting in rotating the pawl member about the axis, wherein
in an un-flexed state of the arm meshing engagement between corresponding teeth arrangements formed on the arm and the fastener permit rotation of the pawl member in only one direction about the axis,
and wherein
the arm of the toggle being arranged to resiliently flex in order to be released from the meshing engagement and by that permit rotation of the pawl member in both clock-wise and counter clock-side directions about the axis.

5. The method of claim 4, wherein the pawl member being hinged for rotation about an axis and comprises a spiral shaped contact face formed about the axis that is arranged to be exposed to the passageway.

6. The method of claim 4 and being for receiving an elongated strip of material within the through-going passageway.

7. A fastener comprising at least one through-going passageway and at least one pawl member projecting into the passageway,
the pawl member being hinged for rotation about an axis and comprising a spiral shaped contact face formed about the axis that is arranged to be exposed to the passageway,
the fastener further comprising a toggle fixed to the pawl member for assisting in rotating the pawl member about the axis, wherein
in an un-flexed state of the toggle the pawl member can be rotated in only one direction about the axis, and
in a flexed state of the toggle the pawl member can be rotated in both clock-wise and counter clock-side directions about the axis.

8. The fastener of claim 7 and comprising corresponding teeth arrangements formed both on the toggle and the fastener which in the un-flexed state of the toggle mesh one with the other to permit the rotation of the pawl member in only the one direction about the axis.

9. The fastener of claim 8, wherein the teeth arrangement of the toggle is comprised on a radical inward side of the toggle.

10. The fastener of claim 8, wherein resiliently flexing the toggle to the flexed state urges its teeth arrangement to un-mesh and by that permit the rotation of the pawl member in both the clock-wise and counter clock-side directions about the axis.

11. The fastener of claim 7 and being arranged to receive in the at least one through-going passageway an elongated strip of material, and the at least one pawl member projecting into the passageway for engaging the elongated strip of material.

12. The fastener of claim 7, wherein the pawl member is configured to engage the elongated strip of material in an engagement substantially preventing it from being pulled back out of the passageway.

13. The fastener of claim 12, wherein the passageway extends between incoming and outgoing openings and opens out of the fastener via these openings, and the engagement substantially preventing the elongated strip of material from being pulled back out of the passageway is configured to occur to a greater extent when the elongated strip of material enters the passageway via the incoming opening than via the outgoing opening.

14. The fastener of claim 13 and comprising means located in the passageway other than the pawl member for engaging the elongated strip of material.

15. The fastener of claim 14, wherein the means are located opposite to the pawl member so that an elongated strip of material entering the passageway is located therebetween.

16. The fastener of claim 15, wherein the pawl member comprises a base for connecting to a remainder portion of the fastener, and the pawl member is configured to at least partially pivot about the base.

17. The fastener of claim 16, wherein an elongated strip of material passing via the passageway and meeting the pawl member is configured to pivot the pawl member generally about the base.

18. The fastener of claim 7, wherein the contact face of the pawl member curves in a plane orthogonal to the axis and winds about the axis at a continuously increasing radial distance from the axis.

19. The fastener of claim 18, wherein rotation of the pawl member in one direction about the axis is arranged to expose towards the passageway portions of the contact face that project further into the passageway.

20. The fastener of claim 7 wherein the elongated strip of material is a clothesline cable.

* * * * *